(12) United States Patent
Zhong

(10) Patent No.: US 8,867,604 B2
(45) Date of Patent: *Oct. 21, 2014

(54) CROSSING ISI CANCELLATION

(71) Applicant: LSI Corporation, San Jose, CA (US)

(72) Inventor: Lizhi Zhong, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,821

(22) Filed: Nov. 8, 2013

(65) Prior Publication Data

US 2014/0064353 A1    Mar. 6, 2014

Related U.S. Application Data

(63) Continuation of application No. 13/073,077, filed on Mar. 28, 2011, now Pat. No. 8,611,482.

(51) Int. Cl.
*H03H 7/30* (2006.01)
*H04L 25/03* (2006.01)

(52) U.S. Cl.
CPC .... *H04L 25/03006* (2013.01); *H04L 25/03057* (2013.01); *H04L 25/03082* (2013.01); *H04L 2025/03356* (2013.01)
USPC ............ 375/233; 375/260; 375/340; 375/348

(58) Field of Classification Search
USPC .......................... 375/233, 348, 326, 360, 346
See application file for complete search history.

(56) References Cited

U.S. PATENT DOCUMENTS

| | | | | |
|---|---|---|---|---|
| 5,675,612 | A * | 10/1997 | Solve et al. | 375/326 |
| 2009/0063072 | A1 * | 3/2009 | Sullivan et al. | 702/70 |
| 2009/0316769 | A1 | 12/2009 | Hidaka et al. | 375/233 |
| 2012/0128055 | A1 * | 5/2012 | Jiang | 375/233 |
| 2012/0201289 | A1 * | 8/2012 | Abdalla et al. | 375/233 |

* cited by examiner

*Primary Examiner* — Qutbuddin Ghulamali
(74) *Attorney, Agent, or Firm* — Christopher P. Maiorana, PC

(57) ABSTRACT

An apparatus comprising an inter symbol interference (ISI) cancellation circuit and a detector circuit. The inter symbol interference (ISI) cancellation circuit may be configured to minimize ISI at data sampling and crossing sampling points in a symbol interval of an input signal. The detector circuit may be configured to generate data samples and crossing samples at the data sampling and crossing sampling points in the symbol interval of the input signal.

20 Claims, 16 Drawing Sheets

CROSSING ISI CANCELLATION

This application relates to U.S. Ser. No. 13/073,077, filed Mar. 28, 2011, which is incorporated by reference in its entirety.

FIELD OF THE INVENTION

The present invention relates to communications generally and, more particularly, to a method and/or apparatus for implementing crossing ISI cancellation.

BACKGROUND OF THE INVENTION

Clock and Data Recovery (CDR) circuits form a part of Serializer/Deserializer (SerDes) receivers. The CDR circuits track the phase of a sampling clock based on some criterion, such as minimizing a Mean-Squared-Error (MSE). Conventional CDR circuits are commonly designed to achieve low target bit-error-ratios (BER) on the order of $10^{-12}$ to $10^{-15}$ errors per bit. One category of CDR circuits commonly used is bang-bang CDR. Bang-bang CDR is widely used in SerDes circuits due to superior jitter tolerance and insensitivity to the Nyquist data pattern (i.e., 1010 . . . ).

Due to impairments in communication channels, previous and future symbols can have interference with a current symbol. Such interference is called inter symbol interference (ISI). From data samples obtained by sampling at the middle of a data eye, it is well understood that the ISI to the data samples needs to be reduced by means of linear or nonlinear equalization. For example, decision feedback equalization (DFE) can be used to remove the ISI at the data sample from the previous symbols. However, inter symbol interference at zero crossings was not well understood in the past. Consequently, a systematic approach to address ISI at zero crossings does not exist.

Because of the lack of a systematic approach, the ISI at the zero crossings is often not addressed properly. While the DFE feedback waveform has the intended magnitude at the data sample, the feedback waveform has only a portion of that magnitude at the zero crossing before or after the data sampling point. The feedback at the data sampling point is often related to the ISI the DFE is designed to remove. However, the feedback at the zero crossing is unrelated to the ISI at that zero crossing, causing the ISI there to be worse or better in an uncontrolled manner. The amount of feedback at the zero crossing depends on the implementation and is often not easily controlled.

Clock and data recovery (CDR) using the zero crossing sample (such as Bang-bang CDR) can be affected by the residual zero-crossing ISI. The zero crossings of the equalized eye can have a wider region due to the residual zero-crossing ISI (quantified as the horizontal eye margin). When jitter is present, the data sampling can occur near the zero crossing region, leading to bit errors.

In general, maximizing both the vertical eye margin and the horizontal margin can be difficult. An equalization method that minimizes the ISI at the data samples often maximizes the vertical eye margin, while an equalization method that minimizes the ISI at the zero crossing samples leads to the best horizontal eye margin. A trade off has to be made as a result.

It would be desirable to have a method of ISI cancellation that balances minimization of ISI at the data samples with minimization of ISI at the zero crossings.

SUMMARY OF THE INVENTION

The present invention concerns an apparatus comprising an inter symbol interference (ISI) cancellation circuit and a detector circuit. The inter symbol interference (ISI) cancellation circuit may be configured to minimize ISI at data sampling and crossing sampling points in a symbol interval of an input signal. The detector circuit may be configured to generate data samples and crossing samples at the data sampling and crossing sampling points in the symbol interval of the input signal.

The objects, features and advantages of the present invention include providing a method and/or apparatus for implementing crossing ISI cancellation that may (i) minimize data ISI and crossing ISI at the same time, (ii) maximize both vertical and horizontal margins, (iii) enable good performance, and/or (iv) provide robustness.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
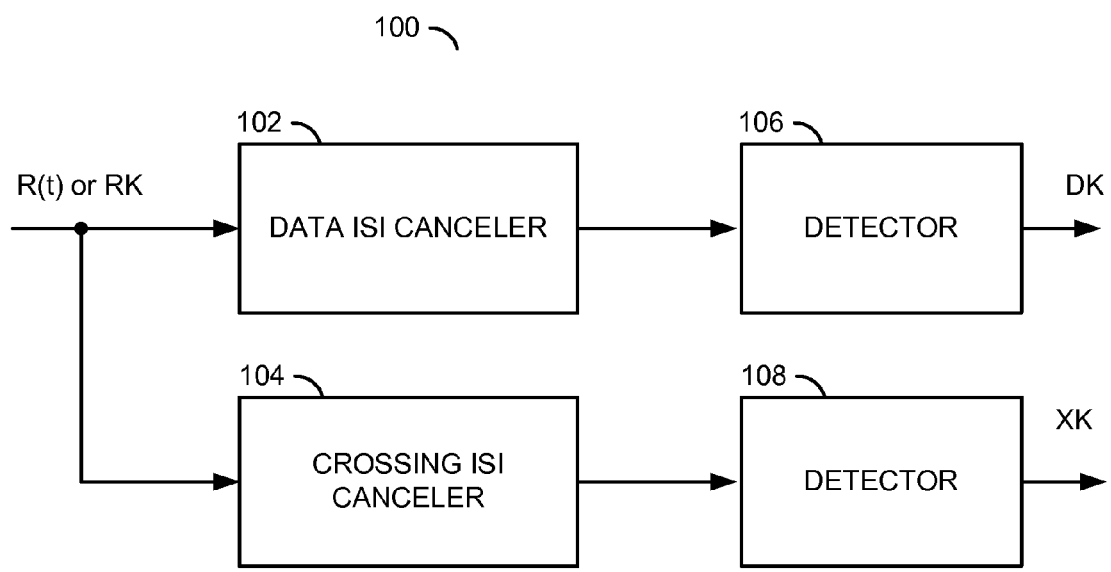
FIG. 1 is a diagram illustrating an example embodiment in accordance with the present invention.

Referring to FIG. 1, a block diagram of a circuit 100 is shown illustrating a data inter symbol interference (ISI) canceler and crossing inter symbol interference (ISI) canceler arranged in accordance with an example embodiment of the present invention. In one example, ISI cancellation at a data input eye and zero crossings of an input signal may be performed simultaneously (in parallel). For example, the circuit 100 may comprise a block (or circuit) 102, a block (or circuit) 104, a block (or circuit) 106, and a block (or circuit) 108. The circuits 102-108 may represent modules and/or blocks that may be implemented as hardware, software, a combination of hardware and software, or other implementations. The block 102 may implement a data ISI canceler. The block 104 may implement a crossing ISI canceler. The blocks 106 and 108 may implement detectors (e.g., symbol detector, crossing detector, bit slicer, etc.).

An input signal (e.g., a signal received via a communication channel) may be presented to an input of the circuit 102 and an input of the circuit 104. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 102 may have an output that may present a first intermediate signal to an input of the circuit 106. The circuit 104 may have an output that may present a second intermediate signal to an input of the circuit 108. The circuit 106 may be configured to generate a data sample signal (e.g., DK) in response to the first intermediate signal. The circuit 108 may be configured to generate a crossing sample signal (e.g., XK) in response to the second intermediate signal. The data and crossing sample signals DK and XK may be used by a following circuit to recover data from the input signal. For example, a clock and data recovery circuit (CDR), such as a bang-bang CDR circuit may be configured to utilize the data and crossing sample signals DK and XK generated by the circuit 100. The arrangement of the circuit 102 and 104 in parallel generally avoids the circuit 102 and the circuit 104 interfering with each other.

Figure 2:
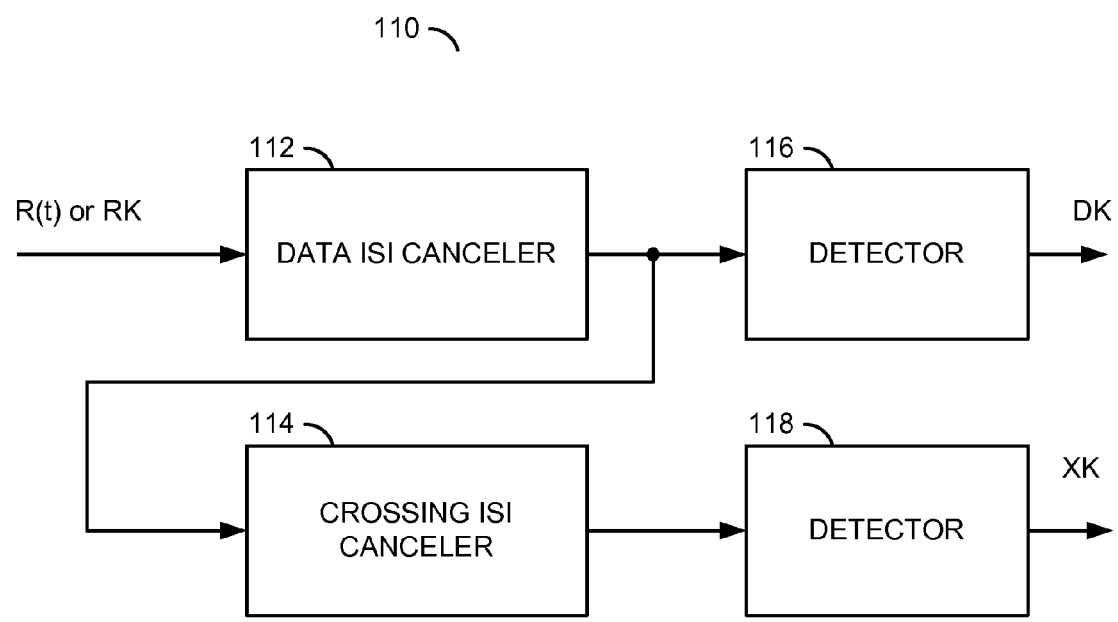
FIG. 2 is a diagram illustrating another example embodiment in accordance with the present invention.

Referring to FIG. 2, a block diagram of a circuit 110 is shown illustrating a data inter symbol interference (ISI) canceler and crossing inter symbol interference (ISI) canceler arranged in accordance with another example embodiment of the present invention. In one example, the crossing ISI canceler and the data ISI canceler may be connected in series. For example, the crossing ISI canceler may be positioned at an output of the data ISI canceler, so that what is inside the data ISI canceler may impact the crossing ISI canceler, but not vice versa. For example, a portion of a decision feedback equalization (DFE) feedback may be present at a crossing sampling point.

The circuit 110 may comprise a block (or circuit) 112, a block (or circuit) 114, a block (or circuit) 116, and a block (or circuit) 118. The circuits 112-118 may represent modules and/or blocks that may be implemented as hardware, software, a combination of hardware and software, or other implementations. The block 112 may implement a data ISI canceler. The block 114 may implement a crossing ISI canceler. The blocks 116 and 118 may implement detectors (e.g., a symbol detector, crossing detector, bit slicer, etc.).

An input signal (e.g., a signal received via a communication channel) may be presented to an input of the circuit 112. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 112 may have an output that may present a first intermediate signal to an input of the circuit 114 and an input of the circuit 116. The circuit 114 may have an output that may present a second intermediate signal to an input of the circuit 118. The circuit 116 may be configured to generate a data sample signal (e.g., DK) in response to the first intermediate signal. The circuit 118 may be configured to generate a crossing sample signal (e.g., XK) in response to the second intermediate signal. The data and crossing sample signals DK and XK may be used by a subsequent circuit to recover data from the input signal. For example, a clock and data recovery circuit (CDR), such as a bang-bang CDR circuit may be configured to utilize the data and crossing sample signals DK and XK generated by the circuit 110.

Figure 3:
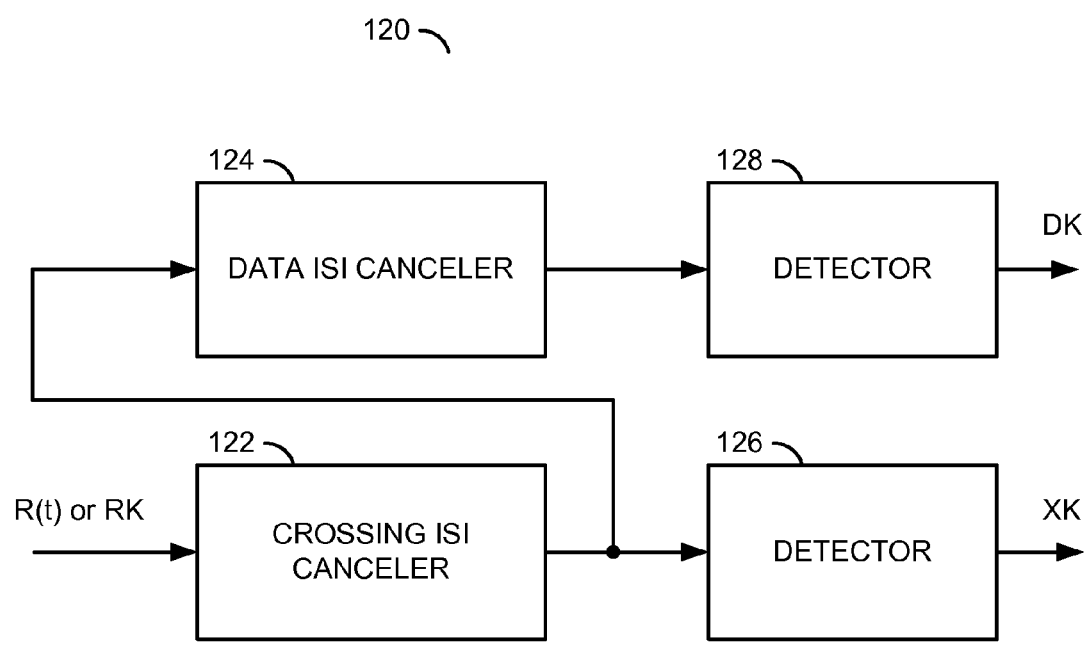
FIG. 3 is a diagram illustrating still another example embodiment in accordance with the present invention.

Referring to FIG. 3, a block diagram of a circuit 120 is shown illustrating a data inter symbol interference (ISI) canceler and crossing inter symbol interference (ISI) canceler arranged in accordance with yet another example embodiment of the present invention. In one example, the crossing ISI canceler and the data ISI canceler may be connected in series. For example, the data ISI canceler may be positioned at an output of the crossing ISI canceler, so that what is inside the crossing ISI canceler may impact the data ISI canceler, but not vice versa. For example, a portion of a crossing cancellation feedback waveform may be present at a data sampling point.

In one example, the circuit 120 may comprise a block (or circuit) 122, a block (or circuit) 124, a block (or circuit) 126, and a block (or circuit) 128. The circuits 122-128 may represent modules and/or blocks that may be implemented as hardware, software, a combination of hardware and software, or other implementations. The block 122 may implement a crossing ISI canceler. The block 124 may implement a data ISI canceler. The blocks 126 and 128 may implement detectors (e.g., a symbol detector, crossing detector, bit slicer, etc.).

An input signal (e.g., a signal received via a communication channel) may be presented to an input of the circuit 122. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 122 may have an output that may present a first intermediate signal to an input of the circuit 124 and an input of the circuit 126. The circuit 124 may have an output that may present a second intermediate signal to an input of the circuit 128. The circuit 126 may be configured to generate a crossing sample signal (e.g., XK) in response to the first intermediate signal. The circuit 128 may be configured to generate a data sample signal (e.g., DK) in response to the second intermediate signal. The data and crossing sample signals DK and XK may be used by a subsequent circuit to recover data from the input signal. For example, a clock and data recovery circuit (CDR), such as a bang-bang CDR circuit may be configured to utilize the data and crossing sample signals DK and XK generated by the circuit 120.

Figure 4:
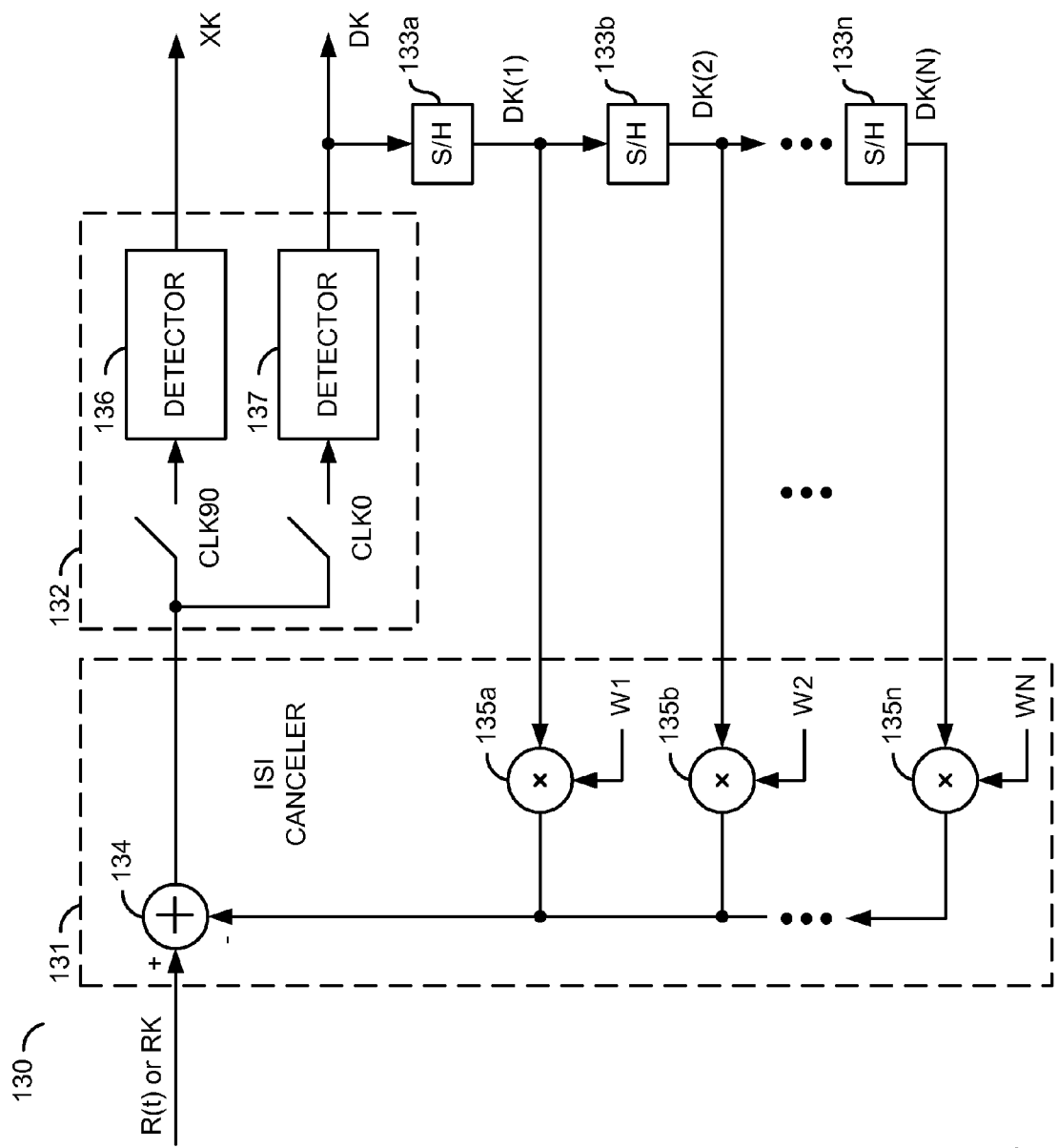
FIG. 4 is a diagram illustrating a combined data and crossing ISI canceler in accordance with yet another example embodiment of the present invention.

Referring to FIG. 4, a block diagram of a circuit 130 is shown illustrating an inter symbol interference (ISI) canceler and a data and crossing detector arranged in accordance with yet another example embodiment of the present invention. In one example, data ISI cancellation and crossing ISI cancellation may be performed by shared circuitry. Data and crossing detectors may be clocked with respective clock signals (e.g., CLK0, CLK90, etc.).

In one example, the circuit 130 may comprise a block (or circuit) 131, a block (or circuit) 132, and a number of blocks (or circuits) 133a-133n. The block 131 may comprise a block (or circuit) 134 and a number of blocks (or circuits) 135a-135n. The block 132 may comprise a block (or circuit 136 and a block (or circuit) 137. The circuits 131-137 may represent modules and/or blocks that may be implemented as hardware, software, a combination of hardware and software, or other implementations. The circuit 131 may implement an ISI canceler. The circuit 132 may implement a data and crossing detector. The circuits 133a-133n may be implemented, in one example, as storage or delay elements (e.g., shift registers, sample and hold elements, etc.). The circuit 134 may be implemented as an adder. The circuits 135a-135n may be implemented, in one example, as multipliers. The circuit 136 may implement a crossing detector. The circuit 137 may implement a data sample detector (e.g., a symbol detector, bit slicer, etc.).

An input signal (e.g., a signal received via a communication channel) may be presented to an input of the circuit 131. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 131 may have an output that may present an intermediate signal to an input of the circuit 132 and a number of inputs that may receive a number of feedback signals. The number of feedback signals may comprise preceding data samples (e.g., DK(1), ... DK(N)). The circuit 131 may be configured to generate the intermediate signal in response to the input signal, the number of feedback signals DK(1), ..., DK(N), and a number of tap weight signals (e.g., W1, ..., WN).

The circuit 132 may have a first output that may present a crossing sample signal (e.g., XK) and a second output that may present a data sample signal (e.g., DK). The circuit 132 may be configured to generate the crossing sample signal XK and the data sample signal DK in response to the intermediate signal and one or more clock signals. For example, the crossing sample signal XK may be generated in response to the intermediate signal and a first clock signal (e.g., CLK90). The data sample signal DK may be generated in response to the intermediate signal and a second clock signal (e.g., CLK0). The clock signals (e.g., CLK0, CLK90, etc.) may differ from one another with respect to phase. The data and crossing sample signals DK and XK may be used by a subsequent circuit to recover data from the input signal. For example, a clock and data recovery circuit (CDR), such as a bang-bang CDR circuit may be configured to utilize the data and crossing sample signals DK and XK generated by the circuit 130.

The data sample signal DK may be presented to an input of the circuit 133a. An output of the circuit 133a may present the data sample DK(1) to an input of the circuit 133b. The circuit 133b may have an output that may present the data sample DK(2). The remaining circuit 133c-133n may be configured similarly to the circuit 133a and 133b to generate the data sample signals DK(3), ..., DK(N).

The circuit 134 may be configured to generate the intermediate signal in response to the input signal and a feedback signal. The feedback signal may be generated in response to the data sample signals DK(1), ..., DK(N) and the tap weight signals W1 through WN. For example, each of the circuits 135a-135n may be configured to weight a respective one of the data sample signals DK(1), ..., DK(N) based upon a respective one of the tap weight signals W1, ..., WN. For example, the circuits 135a-135n may multiply the respective data sample signals DK(1), ..., DK(N) by the respective tap weight signals W1, ..., WN to generate a respective component of the feedback signal used by the circuit 134 to generate the intermediate signal. In one example, the tap weight signals W1, ..., WN may be implemented in accordance with the example illustrated in FIG. 5. In one example, N summing nodes may be implemented, and the circuit 136 and 137 may run at nT to facilitate implementation with lower speed detector circuits. The circuits 136 and 137 may also be combined into one detector, which runs at double the rate of the circuits 136 and 137 to generate the signals XK and DK, alternatively (described below in connection with FIG. 6).

Figure 5:
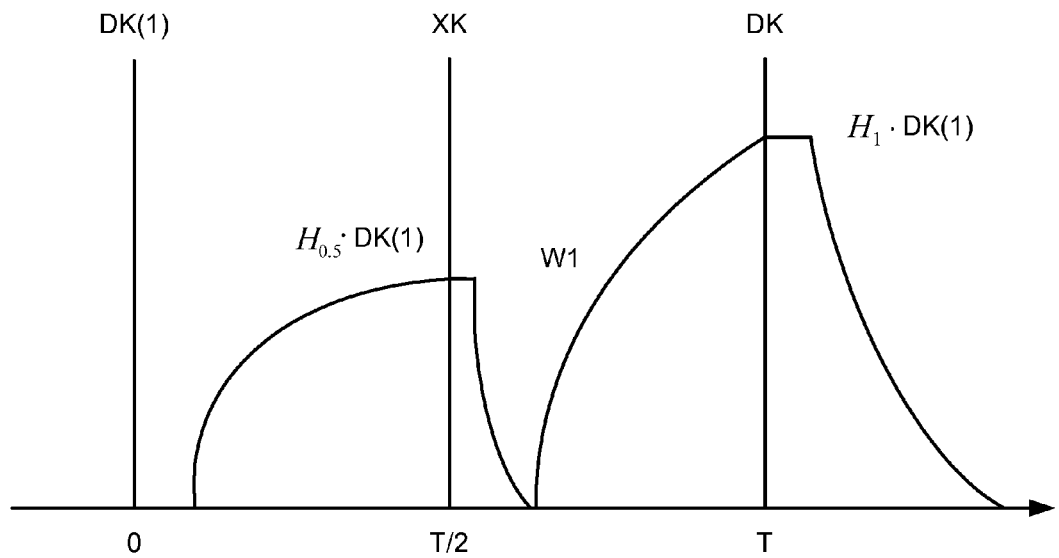
FIG. 5 is a timing diagram illustrating example feedback waveforms of FIG. 4.
Figure 5:
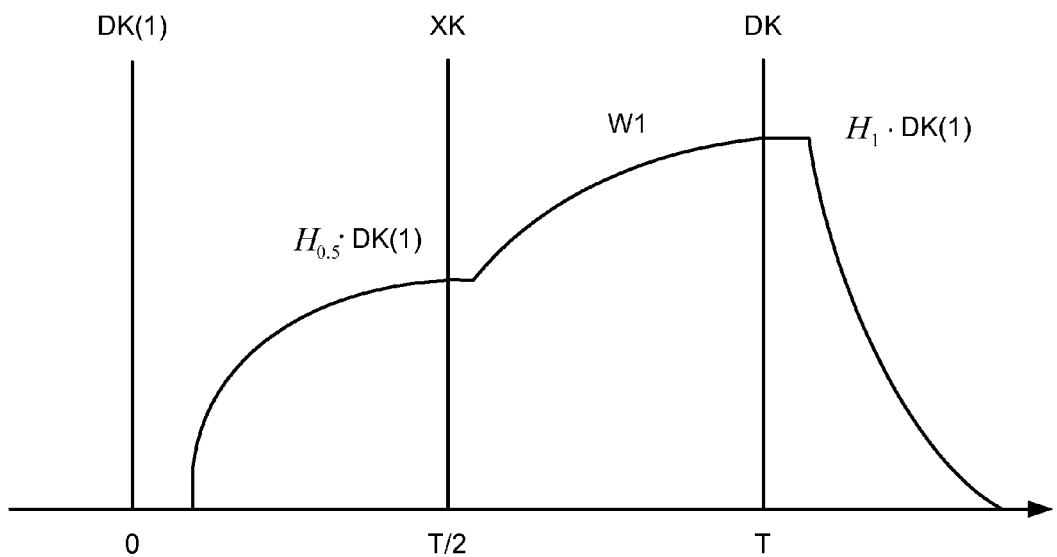

Referring to FIG. 5, timing diagrams 138 and 139 are shown illustrating example feedback waveforms of a tap (e.g., W1) of FIG. 4. The waveform 138 generally corresponds to an embodiment of a double rate canceler. The tap feedback signal W1 may behave similarly to a DFE feedback waveform, except that the waveform W1 may settle in T/2, rather than one T, where T represents a symbol interval. The waveform W1 may also discharge and settle to H1 within the next T/2. For example, W1 may settle to H0.5 at the crossing sample and settle to H1 at the data sample, allowing a single canceler to function as the crossing ISI canceler at the crossing sample and the data ISI canceler at the data sample. The waveform 139 generally illustrates an embodiment where the feedback waveform may be carefully controlled to have two-stage settling. Although the tap feedback signal W1 may not be set or reset as fast as that in a double rate canceler, here the tap feedback signal W1 may settle to H0.5 at the crossing sample and H1 at the data sample, achieving the same effect.

Figure 6:
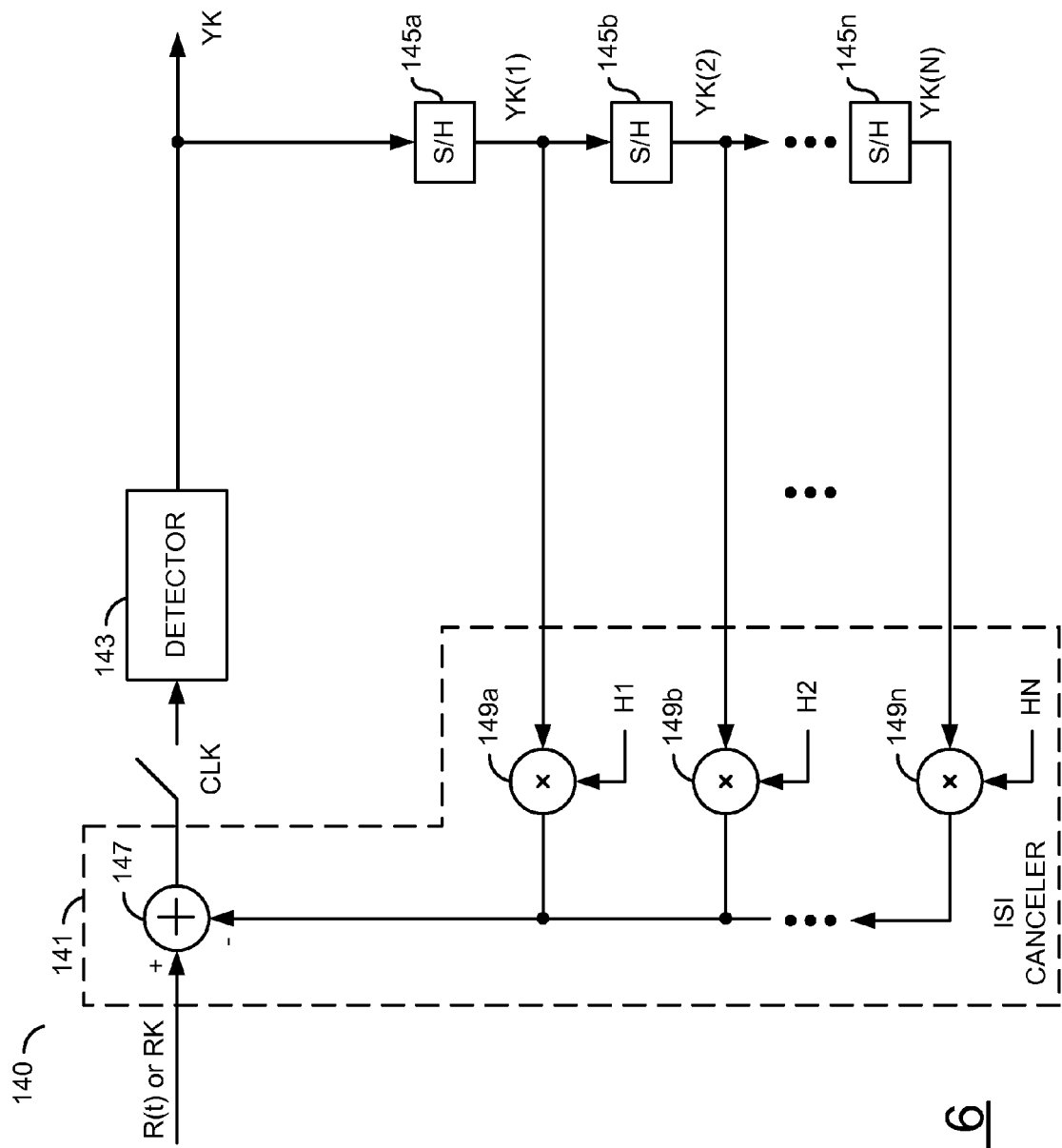
FIG. 6 is a diagram illustrating a simplified implementation of the combined data and crossing ISI canceler of FIG. 4.

Referring to FIG. 6, a diagram of a circuit 140 is shown illustrating another example of data ISI cancellation and crossing ISI cancellation being performed by shared circuitry. In one example, the circuit 140 may comprise a block (or circuit) 141, a block (or circuit) 143, and a number of blocks (or circuits) 145a-145n. The circuit 141 may comprise a block (or circuit) 147 and a number of blocks (or circuits) 149a-149n. The circuits 141-149 may represent modules and/or blocks that may be implemented as hardware, software, a combination of hardware and software, or other implementations. The circuit 141 may implement an ISI canceler. The circuit 143 may implement a detector (e.g., a symbol detector, bit slicer, etc.). The circuits 145a-145n may be implemented, in one example, as storage or delay elements (e.g., shift registers, sample and hold elements, etc.). The circuit 147 may be implemented as an adder. The circuits 149a-149n may be implemented, in one example, as multipliers.

An input signal (e.g., a signal received via a communication channel) may be presented to an input of the circuit 141. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 141 may have an output that may present an intermediate signal to an input of the circuit 143, and a number of inputs that may receive a number of feedback signals. The number of feedback signals may comprise preceding data samples (e.g., DK(1), ..., DK(N)). The circuit 141 may be configured to generate the intermediate signal in response to the input signal, the number of feedback signals DK(1), ..., DK(N), and a number of tap weight signals (e.g., H1, ..., HN). The signal presented to the input of the circuit 143 may be generated by a sampler configured to sample the intermediate signal in response to a clock signal (e.g., CLK). The clock signal CLK may have a frequency that is twice the frequency of the clock signal CLK0.

The circuit 143 may have an output that may present a signal (e.g., YK). The signal YK may be presented to an input of the circuit 145a. An output of the circuit 145a may present the sample YK(1) to an input of the circuit 145b. The circuit 145b may have an output that may present the data sample YK(2). The remaining circuit 145c-145n may be configured similarly to the circuit 145a and 145b to generate the data sample signals YK(3), . . . , YK(N).

The circuit 147 may be configured to generate the intermediate signal in response to the input signal and a feedback signal. The feedback signal may be generated in response to the signals YK(1), . . . , YK(N) and the tap weight signals H1 through HN. For example, each of the circuits 149a-149n may be configured to weight a respective one of the data sample signals YK(1), . . . , YK(N) based upon a respective one of the tap weight signals H1, . . . , HN. For example, the circuits 149a-149n may multiply the respective data sample signals YK(1), . . . , YK(N) by the respective tap weight signals H1, . . . , HN to generate a respective component of the feedback signal used by the circuit 147 to generate the intermediate signal.

In one example, a single detector may be used, running at a double rate, to obtain both the crossing sample XK and the data sample DK. The output of the single detector (e.g., YK) generally comprises two samples (e.g., XK and DK) in one symbol interval. In general, the storage or delay elements 145a-145n are still shifted by one T, rather than T/2. The circuit 140 generally corresponds to a special case of the circuit 130, described above in connection with FIG. 4. However, DFE tap weights H1 through HN are used instead of the feedback signals W1 through WN. In addition, the crossing sample signal XK and delayed versions of the crossing sample signal XK are fed back to cancel the crossing ISI. The circuit 130 may utilize the expression $-H0.5*DK(1)-H1.5*DK(2)- \ldots -HN-0.5*DK(N)$ to cancel the crossing ISI, while the circuit 140 generally implements the equation $-H1*XK(1)-H2*XK(2)- \ldots -HN*XK(N)$ to cancel the crossing ISI. The method illustrated in FIG. 4 is generally correct because it is based upon the formula of crossing ISI. However, the method illustrated in FIG. 6 is generally simpler to implement.

Figure 7:
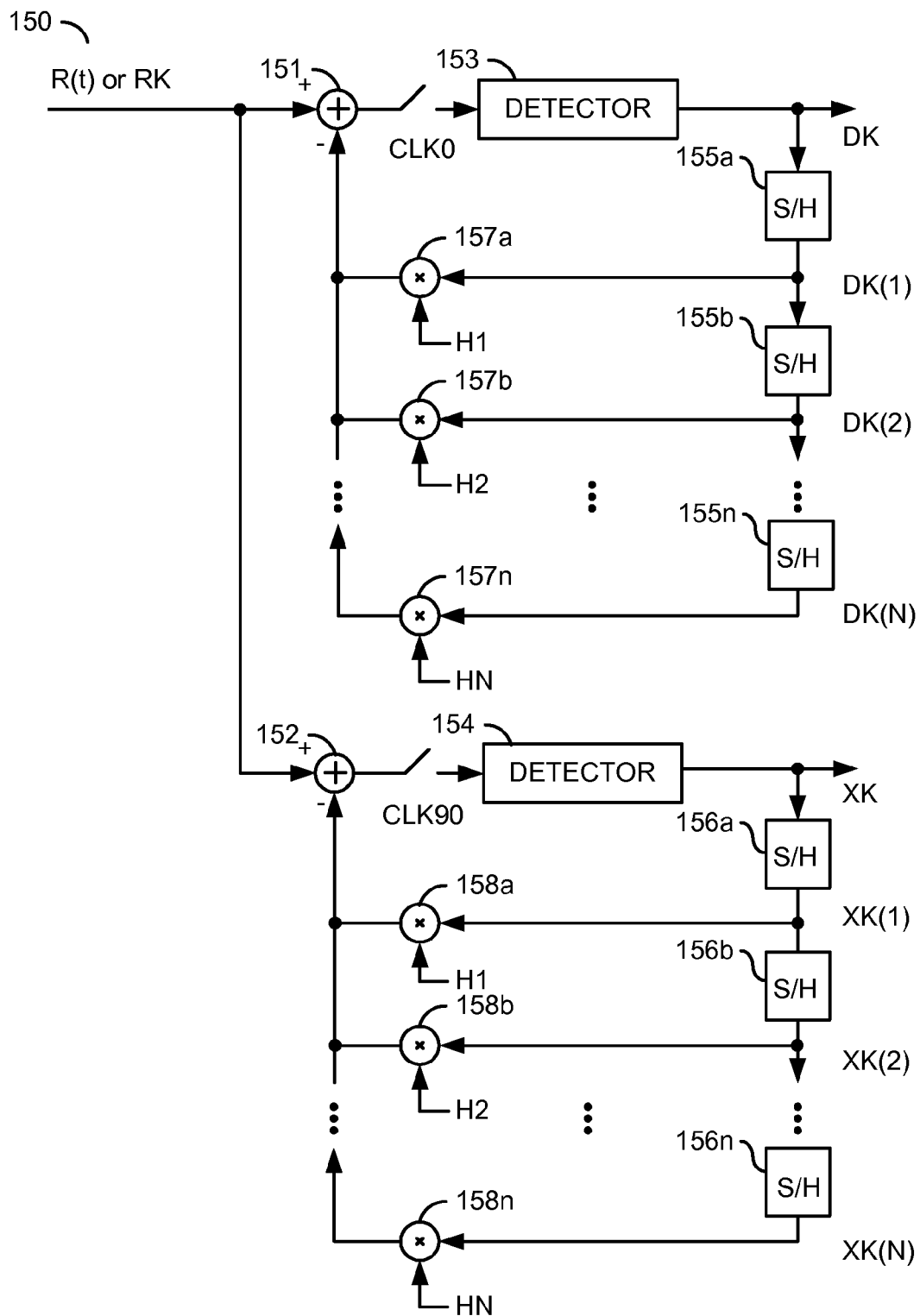
FIG. 7 is a diagram illustrating a 2T version of the combined data and crossing ISI canceler of FIG. 6.

Referring to FIG. 7, a diagram of a circuit 150 is shown illustrating another example of data ISI cancellation and crossing ISI cancellation being performed by shared circuitry. The circuit 150 may comprise a block (or circuit) 151, a block (or circuit) 152, a block (or circuit) 153, a block (or circuit) 154, a number of blocks (or circuits) 155a-155n, a number of blocks (or circuits) 156a-156n, a number of blocks (or circuits) 157a-157n, and a number of blocks (or circuits) 158a-158n. The circuits 151-138 may represent modules and/or blocks that may be implemented as hardware, software, a combination of hardware and software, or other implementations. The circuits 151 and 152 may be implemented, in one example, as adders. The circuit 153 may implement a data detector (e.g., a symbol detector, bit slicer, etc.). The circuit 154 may implement a crossing detector. The circuits 155a-155n and 156a-156n may be implemented, in one example, as storage or delay elements (e.g., shift registers, sample and hold elements, etc.). The circuits 157a-157n and 158a-158n may be implemented, in one example, as multipliers.

An input signal (e.g., a signal received via a communication channel) may be presented to an input of the circuit 151 and an input of the circuit 152. Depending upon the design criteria of a particular implementation, the input signal may comprise an analog signal (e.g., R(t)) or a digital signal (e.g., RK). In one example, some form of processing (e.g., linear equalization, etc.) may already have been performed on the input signal. The circuit 151 may have an output that may present a first intermediate signal to an input of the circuit 153, and an input that may receive a first feedback signal. The circuit 151 may be configured to generate the first intermediate signal in response to the input signal and the first feedback signal. The circuit 152 may have an output that may present a second intermediate signal to an input of the circuit 154, and an input that may receive a second feedback signal. The circuit 152 may be configured to generate the second intermediate signal in response to the input signal and the second feedback signal. The circuit 153 may have an output that may present a data sample signal (e.g., DK). The circuit 154 may have an output that may present a crossing sample signal (e.g., XK).

The signal DK may be presented to an input of the circuit 155a. An output of the circuit 155a may present a signal (e.g., DK(1)) to an input of the circuit 155b and an input of the circuit 157a. The circuit 157a may have a second input that may receive a tap weight (e.g., H1). The circuits 155b-155n and 157b-157n may be configured similarly to the circuits 155a and 157a and the respective signals DK(2)-DK(N) and tap weights H2-HN utilized accordingly. The circuits 157a-157n may have respective outputs that may present signals that may be combined to form the first feedback signal.

The signal XK may be presented to an input of the circuit 156a. An output of the circuit 156a may present a signal (e.g., XK(1)) to an input of the circuit 156b and an input of the circuit 158a. The circuit 158a may have a second input that may receive the tap weight (e.g., H1). The circuits 156b-156n and 158b-158n may be configured similarly to the circuits 156a and 158a and the respective crossing sample signals XK(2)-XK(N) and tap weights H2 -HN utilized accordingly. The circuits 158a-158n may have respective outputs that may present signals that may be combined to form the second feedback signal.

The circuit 153 may be configured to generate the data sample signal DK in response to the first intermediate signal and a first clock signal (e.g., CLK0). The circuit 154 may be configured to generate the crossing sample signal XK in response to the second intermediate signal and a second clock signal (e.g., CLK90). The data and crossing sample signals DK and XK may be used by a subsequent circuit to recover data from the input signal. For example, a clock and data recovery circuit (CDR), such as a bang-bang CDR circuit may be configured to utilize the data and crossing sample signals DK and XK generated by the circuit 150.

In one example, the shared circuit may be implemented using the 2T architecture illustrated. However, an nT architecture may be implemented similarly to meet the design criteria of a particular implementation. Further parallelization may be used to allow the two detectors 153 and 154 to run at a lower rate. The odd path (e.g., detector 153) generally presents DK as an output, while the even path (e.g., detector 154) generally presents XK as an output. In general, the two paths do not interconnect as in a typical 2T-DFE.

The examples illustrated in connection with FIGS. 4-7 generally use direct feedback only. However, as would be apparent to a person of ordinary skill in the art in light of the teachings contained herein, the circuits illustrated in FIGS. 4, 6, and 7 may also be implemented fully or partially unrolled (as illustrated below in connection with FIGS. 11-13).

Figure 8:
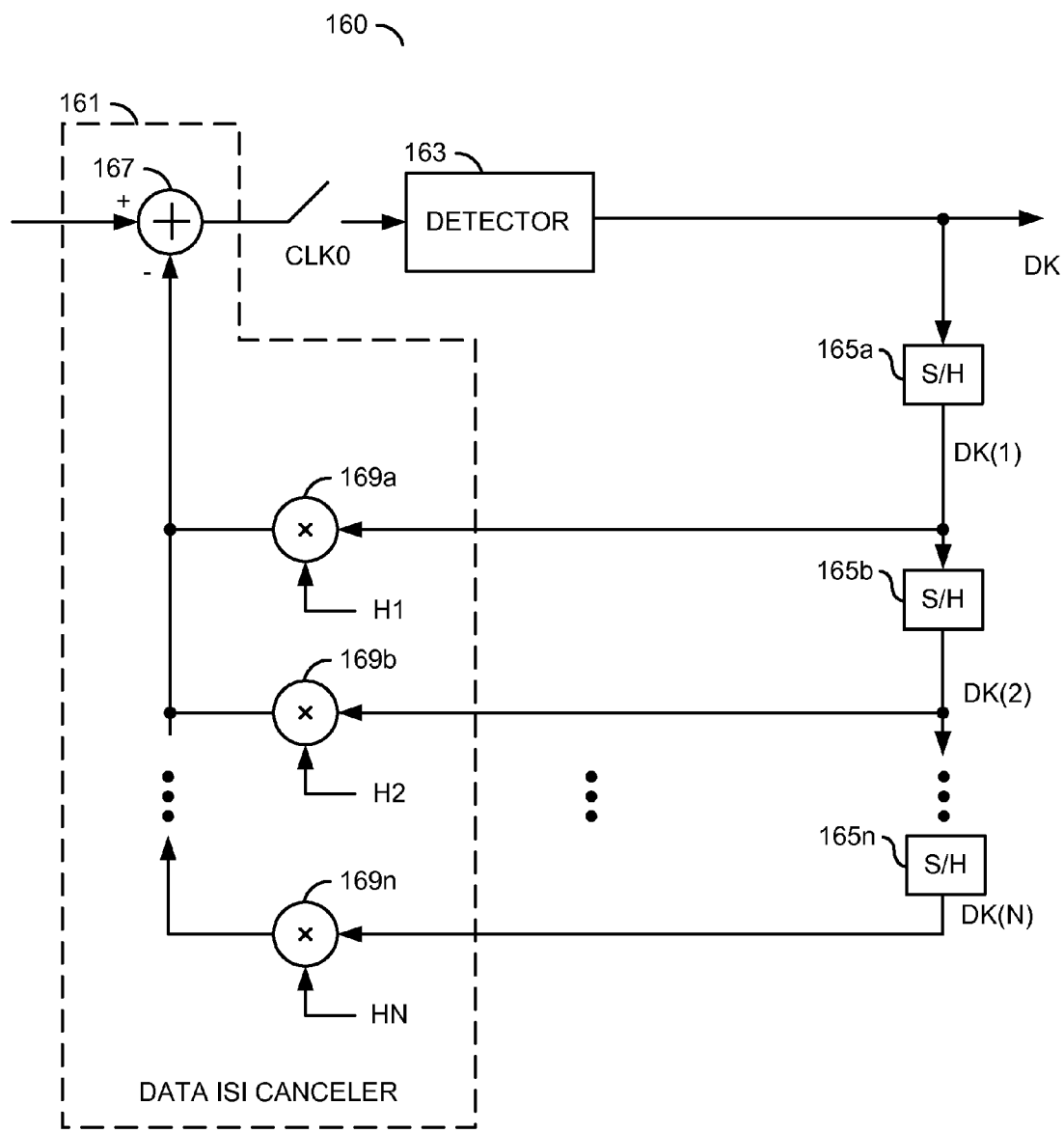
FIG. 8 is a diagram illustrating an example data ISI canceler in accordance with an embodiment of the present invention.

Referring to FIG. 8, a diagram of a circuit 160 is shown illustrating an example of a data ISI canceler in accordance with an embodiment of the present invention. The circuit 160 is generally configured as a full rate decision feedback equalizer (DFE). In one example, the circuit 160 may comprise a block (or circuit) 161, a block (or circuit) 163, and a number of blocks (or circuits) 165a-165n. The block 161 may comprise a block (or circuit) 167 and a number of blocks (or circuits) 169a-169n. The circuits 161-169n may represent modules and/or blocks that may be implemented as hardware, software, a combination of hardware and software, or other implementations. The circuit 161 may implement a data ISI canceler. The circuit 163 may implement a detector. The circuit 165a-165n may be implemented as storage or delay elements (e.g., shift registers, sample and hold elements, etc.). The circuit 167 may be implemented as an adder. The circuit 169a-169n may be implemented as multipliers. The circuit 163 may include a sampler configured to sample the intermediate signal in response the clock signal CLK0.

In one example, the circuit 167 or the circuit 163 may be configured to run at half rate or some other rate lower than the full rate by using an nT architecture (e.g., n parallel branches). The circuit 160 is illustrated implementing direct feedback. However, the circuit 160 may be fully unrolled, or partially unrolled (some taps unrolled while the remaining taps use the summing node 167). The detector 163 and the circuits 165a-165n are not generally considered part of the data ISI canceler 161. Only the feedback multipliers 169a-169n and the summing node 167 are generally considered part of the data ISI canceler. For unrolled DFE (either fully unrolled or partially unrolled), the unrolling may be done inside the detector or before the detector, similar to the crossing ISI canceler illustrated in FIGS. 11 and 12. An example of a partial unrolling before the detector may be found illustrated in FIG. 13, where the first tap is unrolled. Two comparators, one with a threshold of H1 and another with a threshold of −H1, may be used to the accomplish the unrolling. In general, the number of taps unrolled may be any number from 0 to N.

Figure 9:
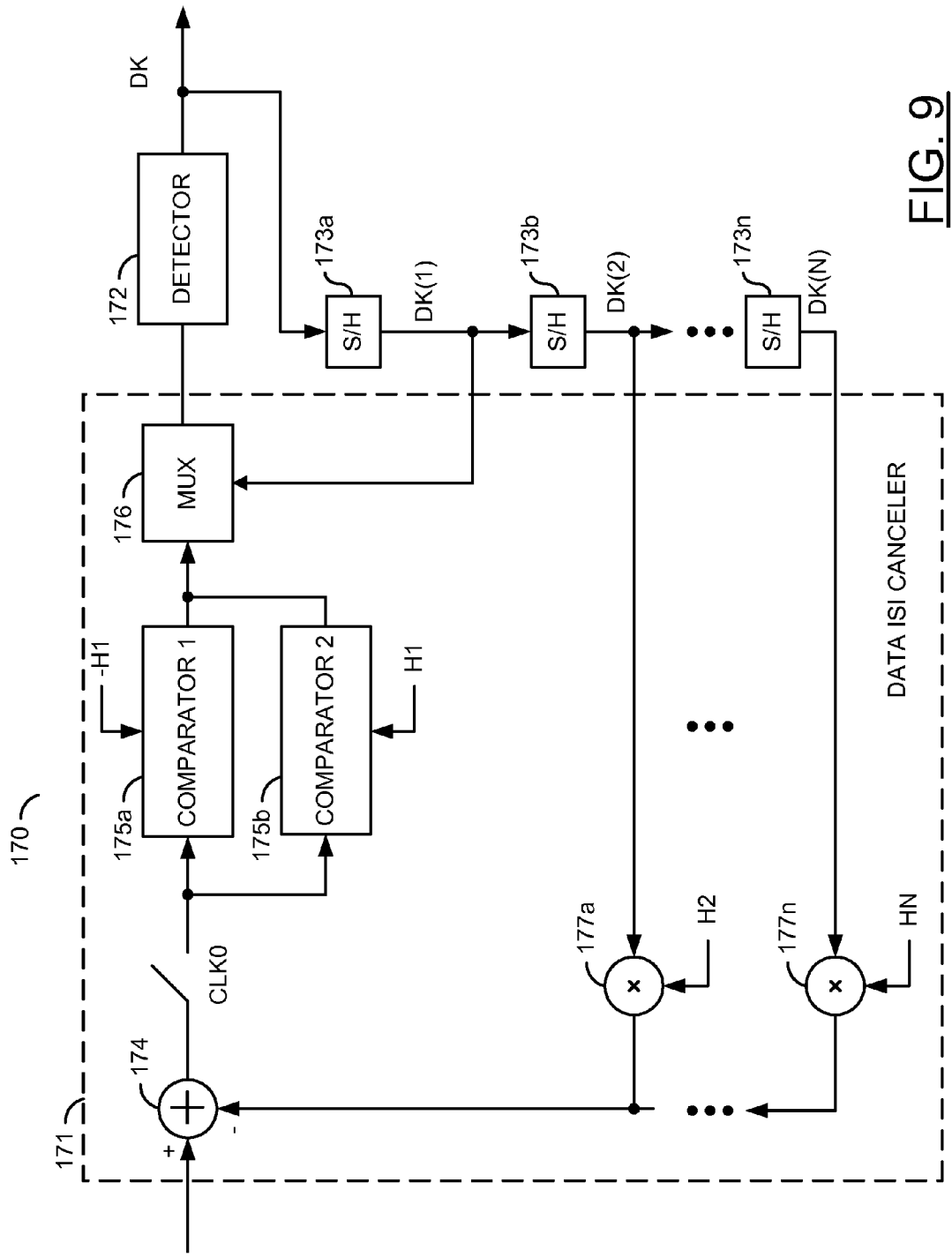
FIG. 9 is a diagram illustrating another example data ISI canceler in accordance with an embodiment of the present invention.

Referring to FIG. 9, a diagram of a circuit 170 is shown illustrating another example of a data ISI canceler in accordance with an embodiment of the present invention. In one example, the circuit 170 may comprise a block (or circuit) 171, a block (or circuit) 172, and a number of blocks (or circuits) 173a-173n. The block 171 may comprise a block (or circuit) 174, a pair of blocks (or circuits) 175a and 175b, a block (or circuit) 176, and a number of blocks (or circuits) 177b-177n. The circuits 171-177n may represent modules and/or blocks that may be implemented as hardware, software, a combination of hardware and software, or other implementations. The circuit 171 may implement a data ISI canceler. The circuit 172 may implement a detector. The circuit 173a-173n may be implemented as storage or delay elements (e.g., shift registers, sample and hold elements, etc.). The circuit 174 may be implemented as an adder. The circuits 175a and 175b maybe implemented as comparators. The circuit 176 may be implemented as a multiplexer. The circuits 177b-177n may be implemented as multipliers. The circuit 171 may include a sampler configured to sample an output of the circuit 174 in response the clock signal CLK0. FIG. 9 generally illustrates an example where unrolling is done before the detector. The comparators 175a and 175b, which are part of the data ISI canceler, may be used instead of direct feedback for the first tap. A sampler may be implemented within the data ISI canceler, either before the summing node 174 (e.g., in an analog-to-digital converter (ADC)) or after the summing node 174. In an analog implementation of the circuit 170, the sampler, comparators and detector may be implemented together in a capture latch. In a digital signal processing (DSP) implementation, the sampler may be implemented in the ADC, and the comparators may or may not be combined with the detector.

Figure 10:
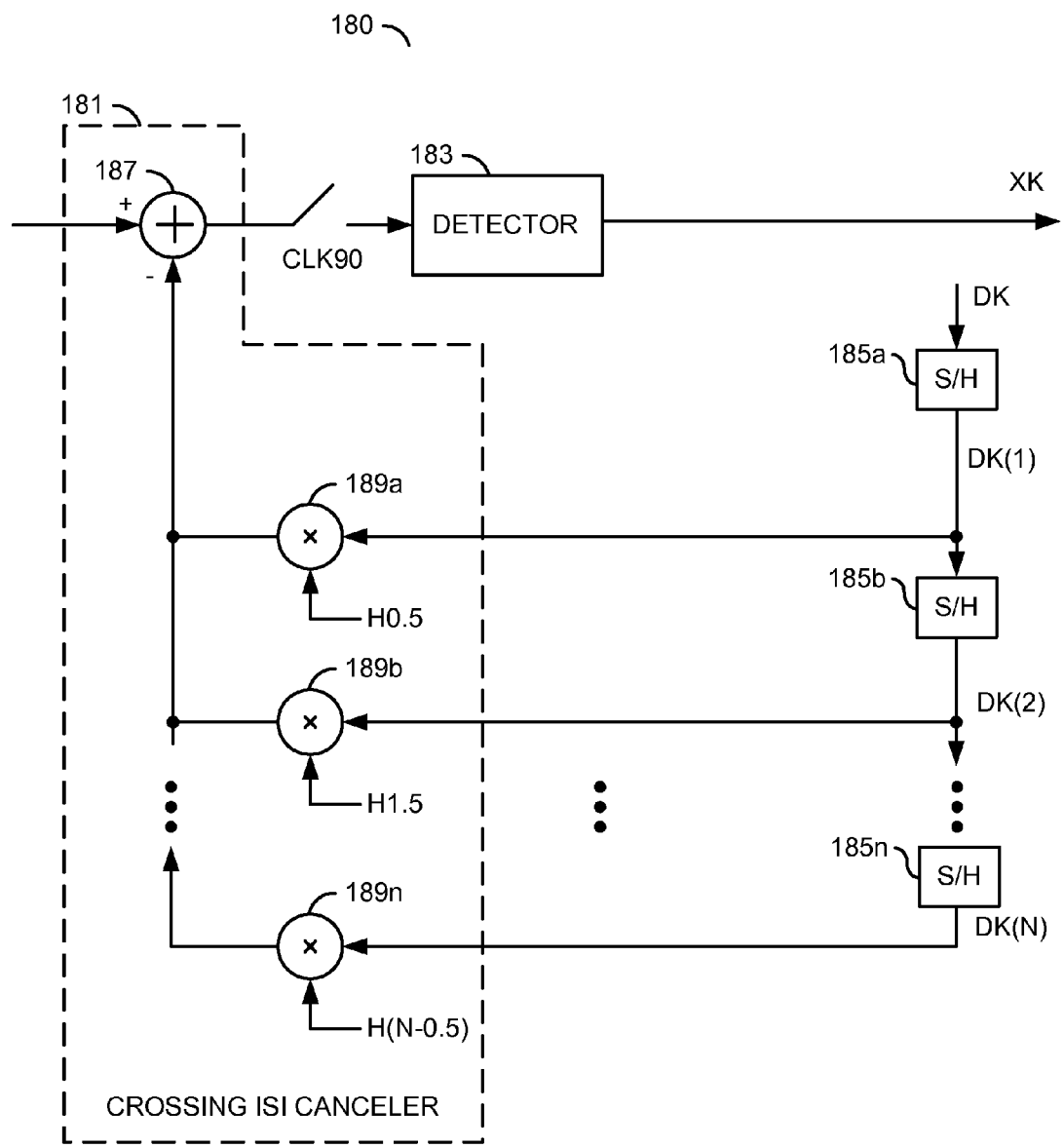
FIG. 10 is a diagram illustrating an example crossing ISI canceler implemented in accordance with an embodiment of the present invention.
Figure 11:
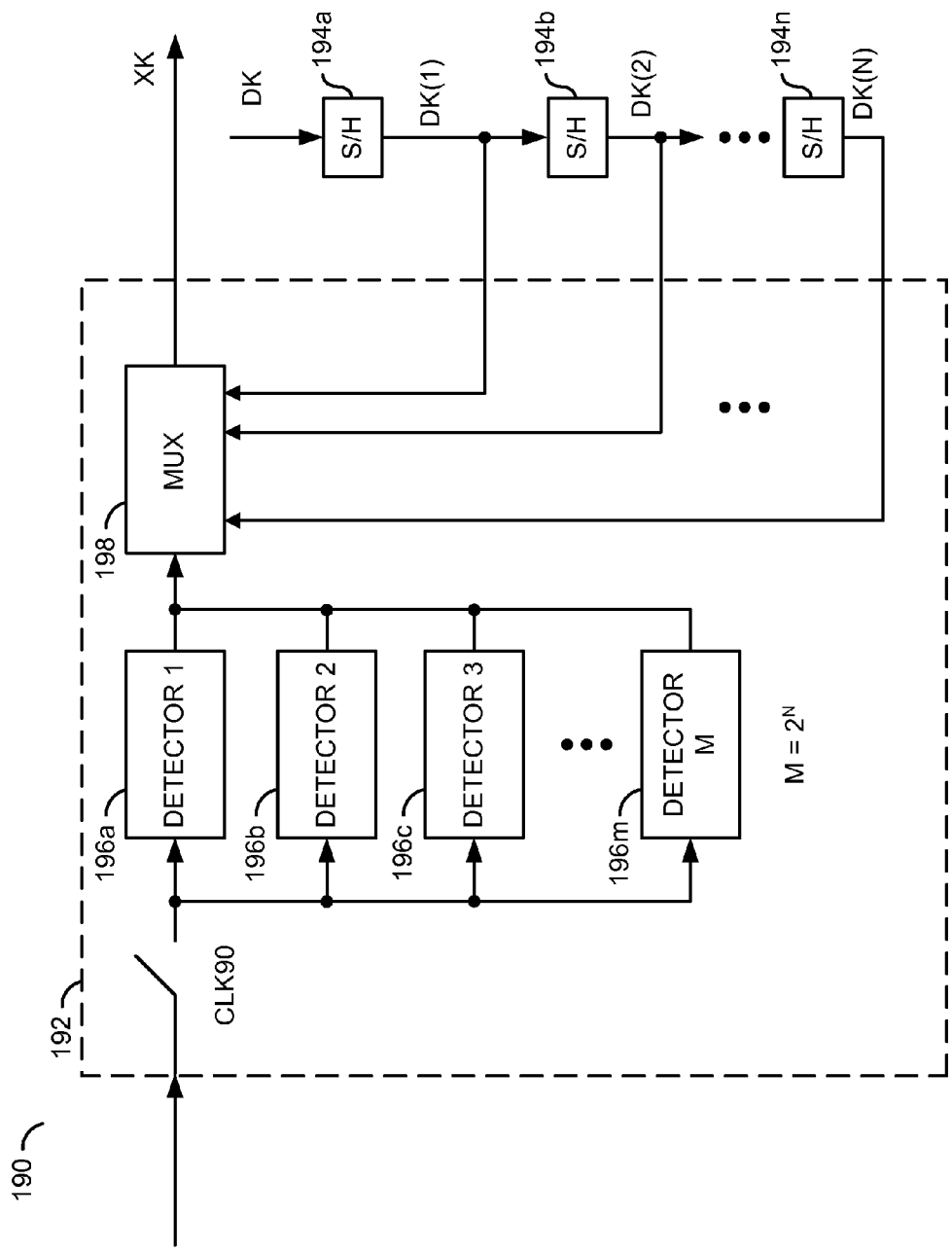
FIG. 11 is a diagram illustrating an example ISI canceling crossing detector implemented in accordance with another embodiment of the present invention.
Figure 12:
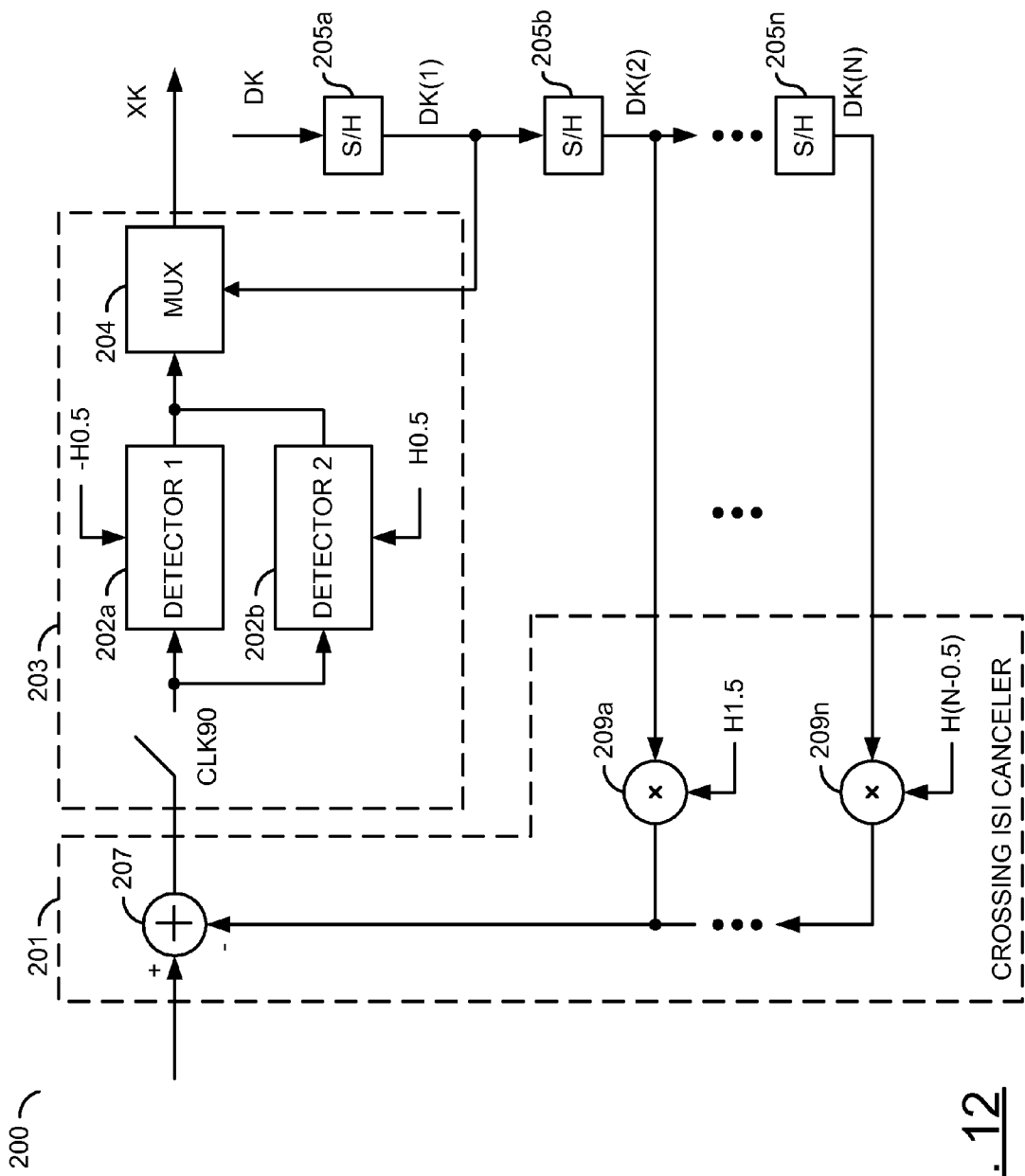
FIG. 12 is a diagram illustrating example crossing ISI canceler and detector circuits implemented in accordance with yet another example embodiment of the present invention.

Referring to FIGS. 10 through 13, diagrams are shown illustrating different examples of crossing ISI cancelers in accordance with example embodiments of the present invention. FIG. 10 generally illustrates a circuit 180 implementing a direct feedback version. FIG. 11 generally illustrates a circuit 190 implementing a fully unrolled version. FIG. 12 generally illustrates a circuit 200 implementing an example of a hybrid, with the first tap unrolled in the detector. In general, any number of taps (e.g., 0 to N) may be unrolled. Unrolling is generally used when there is enough time for the feedback waveform to settle to an intended magnitude. For example, the term H0.5*DK(1) has only T/2 to settle before XK needs to be generated. When this is not possible, the first tap may be unrolled.

Figure 13:
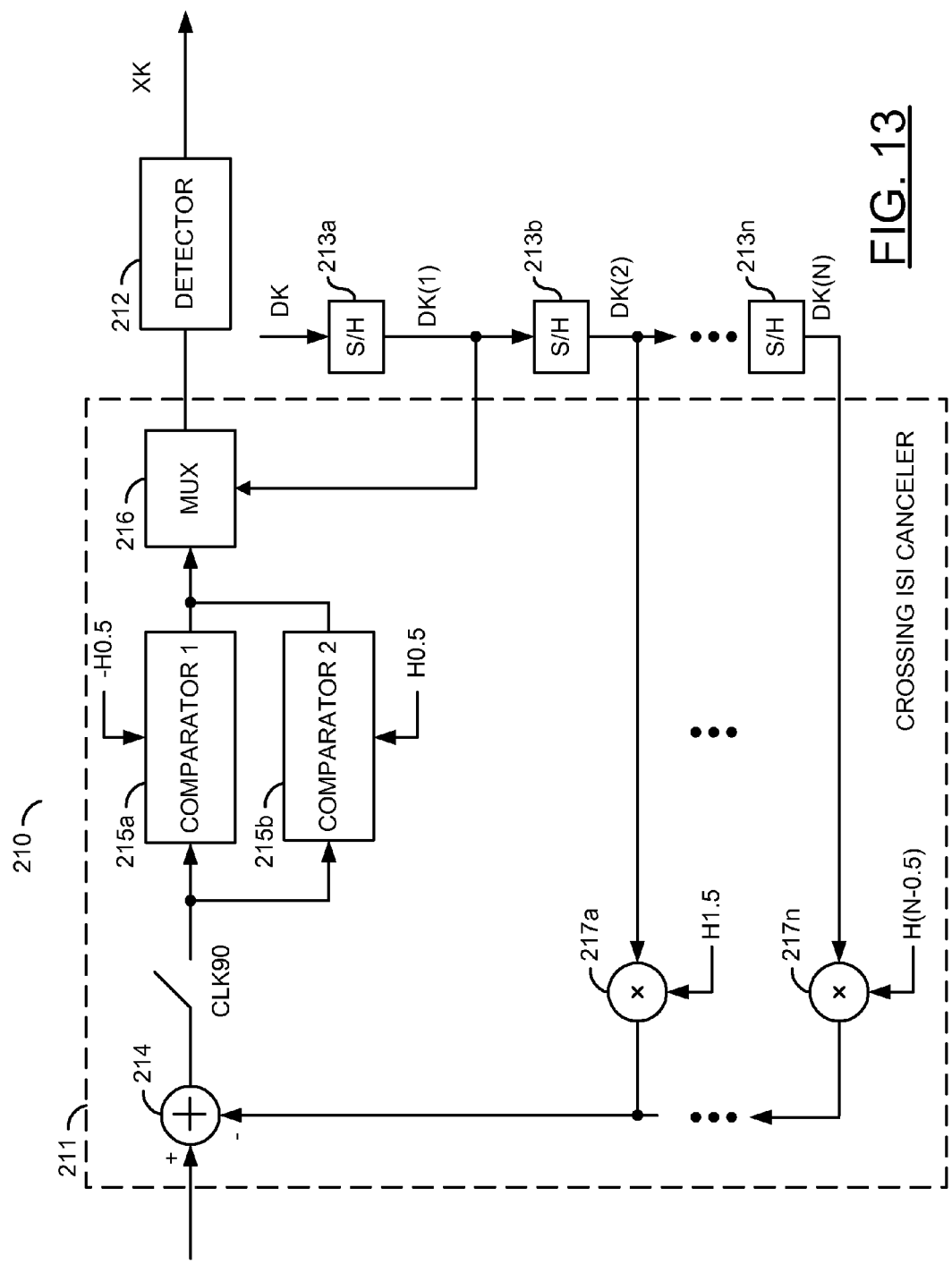
FIG. 13 is a diagram illustrating a crossing ISI canceler in accordance with still another example embodiment of the present invention.

FIG. 13 generally illustrates a circuit 210 implementing an example where the unrolling is done before the detector. Comparators, which are part of the crossing ISI canceler, may be used instead of direct feedback for the first tap. A sampler may be implemented within the crossing ISI canceler, either before the summing node (e.g., in an analog-to-digital converter (ADC)) or after the summing node. In an analog implementation of the circuit 210, the sampler, comparator and detector may be implemented together in a capture latch. In a digital signal processing (DSP) implementation, the sampler may be implemented in the ADC, and the comparator may or may not be combined with the detector. Referring again to FIGS. 10 through 13, the shift registers (185a-185n, 194a-194n, 205a-205n, and 213a-213n) and detectors (183, 196a-196m, 202a-202b, and 212) are generally not part of the crossing ISI cancelers. The shift registers (185a-185n, 194a-194n, 205a-205n, and 213a-213n) are generally shared with the data ISI canceler. The examples shown in FIGS. 10 through 13 generally illustrate full rate implementations. In general, an nT architecture may be used for either the summing nodes, the detectors, or both summing nodes and detectors. The clock signal CLK90 is earlier than (leads) the clock signal CLK0. The phase between the clock signals CLK90 and CLK0 may be 90 degrees or some other values. The term H0.5 is generally defined by the equation H0.5=P0.5−P−0.5.

Referring again to FIG. 11, N previous symbols may be used to select one output from 2^N detector outputs. In one example, a multiplexer 198 (MUX) may be configured to select between the outputs from the 2^N detectors 196a-196m based upon the N previous symbols DK(1), ..., DK(N). A threshold of each of the detectors 196a-196m may be one of the linear combinations of the terms H0.5, H1.5, ..., HN−0.5. For example, one threshold may be H0.5+H1.5+...+HN−0.5.

Referring again to FIG. 12, the threshold for the first detector 202a may be set as −H0.5 and the threshold for the second detector 202b may be set as H0.5. The detectors 196a-196m in FIG. 11 and the detectors 202a and 202b in FIG. 12 are generally configured to perform both a comparison with the respective threshold, and a conversion to symbols (e.g., one bit for NRZ, 2-bits for PAM4, etc.). The inputs to the multiplexer 198 in FIG. 11 and the multiplexer 204 in FIG. 12 are generally already symbols.

Referring again to FIG. 13, a diagram is shown illustrating an example where the detector is after the multiplexer and is separated from the comparators. In one example, the input to the multiplexer 216 may be a 7-bit signal, but the output of the detector 212 may be 2-bits for PAM4.

Figure 14:
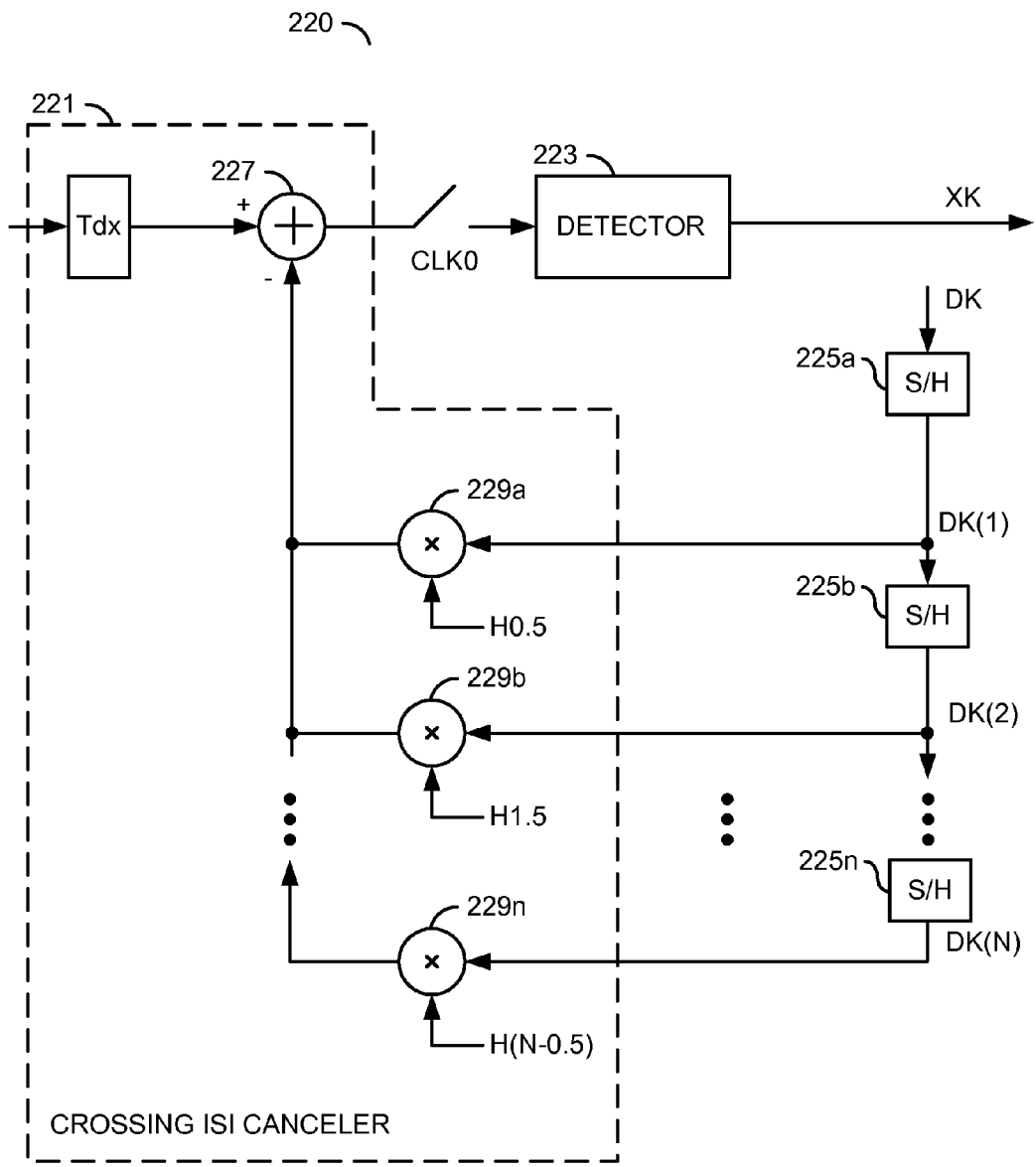
FIG. 14 is a diagram illustrating a crossing ISI canceler in accordance with another example embodiment of the present invention.

Referring to FIG. 14, a diagram is shown illustrating a circuit 220 implementing a crossing ISI canceler in accordance with another embodiment of the present invention. In one example, the circuit 220 may comprise a block (or circuit) 221, a block (or circuit) 223, and a number of blocks (or circuits) 225a-225n. The block 221 may comprise a block (or circuit) 227 and a number of blocks (or circuits) 229a-229n. The circuits 221-229n may represent modules and/or blocks that may be implemented as hardware, software, a combination of hardware and software, or other implementations. The circuit 221 may implement a crossing ISI canceler. The circuit 223 may implement a detector. The circuit 225a-225n may be implemented as storage or delay elements (e.g., shift registers, sample and hold elements, etc.). The circuit 227 may be implemented as an adder. The circuit 229*a*-229*n* may be implemented as multipliers. The circuit 223 may include a sampler configured to sample the intermediate signal in response the clock signal CLK0.

A delay line 230 may be implemented inside the crossing ISI canceler 221 to allow the same sampling clock CLK0 to be used for both XK and DK. In addition to fewer sampling clocks, the delay line 230 generally provides a benefit in that when XK is processed, XK is already one T after DK(1), rather T/2. This gives H0.5*DK(1) enough time to settle before the crossing sampling point. Consequently, the use of a delay line 230 provides an alternative solution to the unrolling of the first tap when the settling time cannot be less than T/2. The delay (e.g., Tdx) of the delay line 230 is generally set to correspond to 90 degrees of phase difference. However, other delay values may be implemented accordingly to meet the design criteria of a particular implementation.

Figure 15:
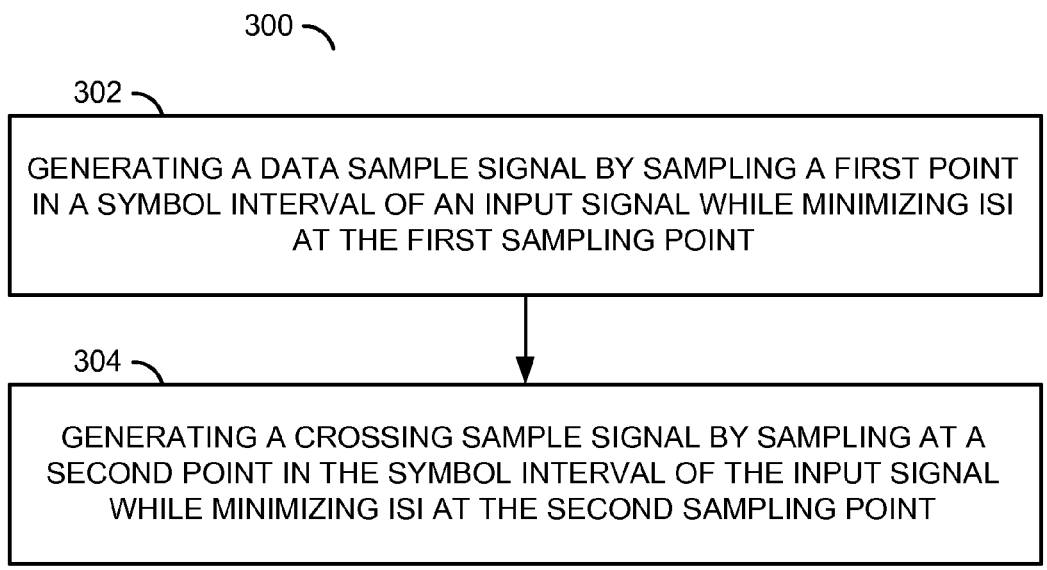
FIG. 15 is a flow diagram illustrating a process in accordance with an embodiment of the present invention.

Referring to FIG. 15, a flow diagram is shown illustrating an example process (or method) 300 in accordance with an embodiment of the present invention. The method 300 may comprise a step (or state) 302 and a step (or state) 304. In the step 302, the process 300 may generate a data sample signal by sampling a first point in a symbol interval of an input signal while minimizing ISI at the first sampling point. In the step 304, the process 300 may generate a crossing sample signal by sampling at a second point in the symbol interval of the input signal while minimizing ISI at the second sampling point.

Figure 16:
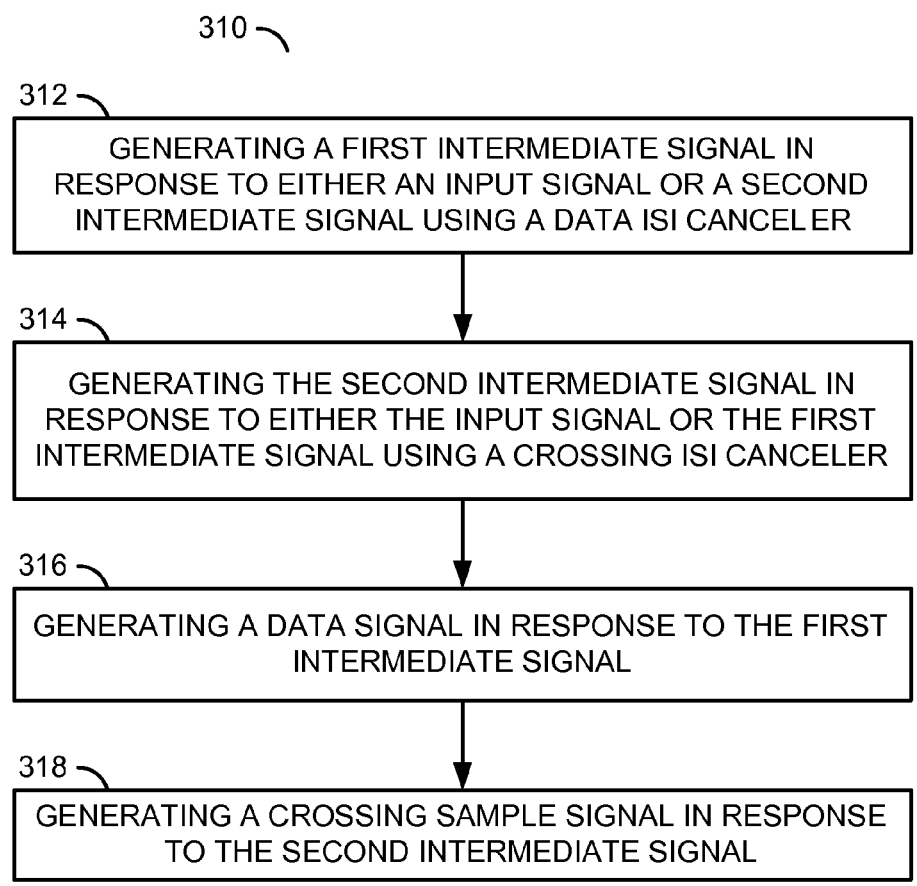
FIG. 16 is a flow diagram illustrating a process in accordance with another embodiment of the present invention.

Referring to FIG. 16, a flow diagram is shown illustrating another example process (or method) 310 in accordance with an embodiment of the present invention. The method 310 may comprise a step (or state) 312, a step (or state) 314, a step (or state) 316, and a step (or state) 318. In the step 312, the process 310 may begin by generating a first intermediate signal in response to either an input signal or a second intermediate signal using a data ISI canceler. In the step 314, the process 310 may generate a second intermediate signal in response to either the input signal or the first intermediate signal using a crossing ISI canceler. In the step 316, the process 310 may generate a data signal in response to the first intermediate signal. In the step 318, the process 310 may generate a crossing sample signal in response to the second intermediate signal.

Figure 17:
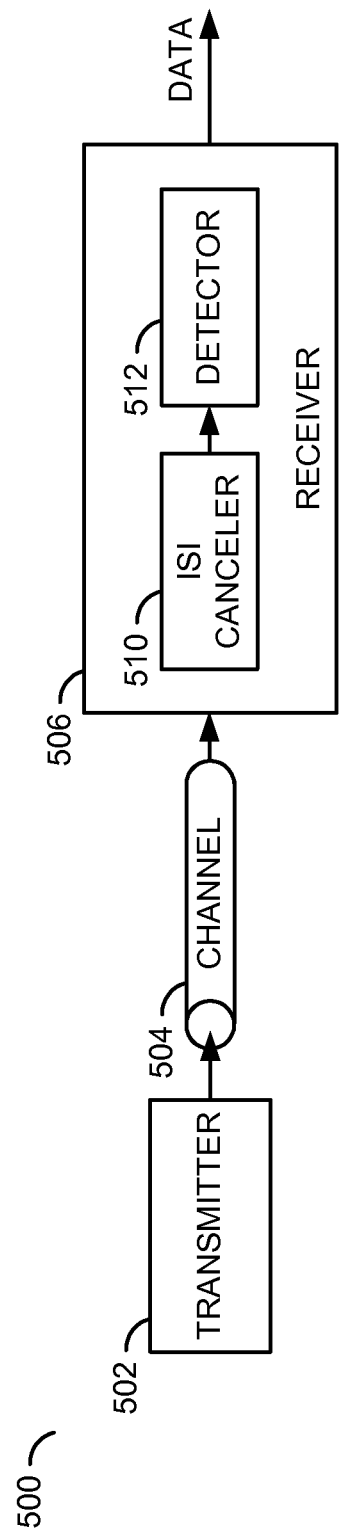
FIG. 17 is a diagram illustrating a context in which embodiments of the present invention may be implemented.

Referring to FIG. 17, a diagram of a system 500 is shown illustrating a context in which embodiments of the present invention may be implemented. In one example, the system 500 may be part of a communication system. The system 500 may comprise a transmitter 502, a communication channel 504, and a receiver 506. The communication channel 504 generally couples the transmitter 502 with the receiver 506. The receive 506 may comprise a block (or circuit) 510 and a block (or circuit) 512. The circuit 510 may implement inter symbol interference (ISI) cancellation in accordance with various embodiments of the present invention. For example, the circuit 510 may be configured to minimize data and crossing ISI. The circuit 512 may implement a detector in accordance with various embodiments of the present invention. For example, the circuit 512 may be configured to generate data and crossing samples. In one example, the receiver 506 may recover data transmitted from the transmitter 502 in response to the data and crossing samples generated by the circuit 512. For example, the receiver 506 may implement bang-bang clock and date recovery (CDR).

The method and/or apparatus in accordance with example embodiments of the present invention generally operate to minimize the data ISI and crossing ISI at the same time, so that both vertical and horizontal eye margins may be maximized, to enable good performance and robustness. The closed form of the ISI at the crossing may be expressed by the following equation:

$$XK = \ldots + (P0.5 - P - 0.5)*DK(1) + P1.5*DK(2) + P2.5*DK(3) + \ldots$$

To minimize XK, the ISI from previous data samples (e.g., DK(1), DK(2), etc.) should be canceled. A dedicated crossing ISI canceler may be implemented similarly to a decision feedback equalizer (DFE) with feedback from the previous data samples. However, the tap weights of the dedicated crossing ISI canceler may be set based on the estimates of the channel pulse response at the 0.5UI (unit interval), 1.5UI, etc. The dedicated crossing ISI canceler may be used alone or in addition to a DFE. When the dedicated crossing ISI canceler is used in addition to the DFE, the DFE may be used to minimize the data ISI, while the dedicated crossing ISI canceler is used to remove the crossing ISI. When the dedicated crossing ISI canceler is used in addition to the DFE, both vertical and horizontal margins may be maximized. When the dedicated crossing ISI canceler is used in addition to the DFE, a separate summing circuit may be used either in parallel or subsequent to the summing circuit used by the DFE. The separate summing circuit may reduce cross coupling of the DFE and the dedicated crossing ISI canceler at the data and crossing samples.

The functions performed by the diagrams of FIGS. 15 and 16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an inter symbol interference (ISI) cancellation circuit configured to minimize ISI at data sampling and crossing sampling points in a symbol interval of an input signal; and
   a detector circuit configured to generate data samples and crossing samples at the data sampling and crossing sampling points in the symbol interval of the input signal, wherein each crossing sample is generated in response to a sample of an output signal of the ISI cancellation circuit sampled at the crossing sampling point in the symbol period of the input signal, a first threshold, a second threshold, and a prior data sample.

2. The apparatus according to claim 1, wherein said inter symbol interference (ISI) cancellation circuit comprises:
   a data ISI cancellation circuit configured to generate a first intermediate signal in response to either the input signal or a second intermediate signal; and
   a crossing ISI cancellation circuit configured to generate the second intermediate signal in response to either the input signal or the first intermediate signal.

3. The apparatus according to claim 2, wherein said data ISI cancellation circuit comprises a decision feedback equalizer (DFE).

4. The apparatus according to claim 2, wherein said crossing ISI cancellation circuit comprises:
   an adder configured to generate an output signal in response to a signal presented to an input of said crossing ISI cancellation circuit and a plurality of feedback signals;
   at least one pair of comparators, said pair of comparators comprising a first comparator having said first threshold and a second comparator having said second threshold;
   a sampler configured to sample the output signal in response to a clock signal and present samples to the first and the second comparators;
   at least one multiplexer configured to select between an output of the first comparator and an output of the second comparator in response to a data sample from said input signal; and
   a plurality of multipliers, each configured to generate a respective one of said plurality of feedback signals in response to a respective data sample from said input signal and a respective tap weight.

5. The apparatus according to claim 2, wherein said detector circuit comprises:
   a first detector having said first threshold;
   a second detector having said second threshold; and
   a multiplexer configured to select between an output of the first detector and an output of the second detector as a crossing sample in response to a prior data sample from said first intermediate signal.

6. The apparatus according to claim 5, wherein said detector circuit further comprises:
   a sampler configured to sample said second intermediate signal and present the samples to said first and said second detectors.

7. The apparatus according to claim 2, wherein said detector circuit comprises:
   a first detector circuit configured to generate a data signal in response to the first intermediate signal; and
   a second detector circuit configured to generate a crossing sample signal in response to the second intermediate signal.

8. The apparatus according to claim 1, wherein said ISI cancellation circuit comprises:
   an adder configured to generate said output signal in response to said input signal and a plurality of feedback signals;
   a plurality of multipliers, each configured generate a respective one of said plurality of feedback signals in response to a respective sample of said output signal and a tap weight.

9. The apparatus according to claim 1, wherein said apparatus is part of a receiver.

10. The apparatus according to claim 1, further comprising a bang-bang clock and data recovery (CDR) circuit configured to adjust a phase of a sampling clock of a receiver based upon the data and crossing samples generated by said detector circuit.

11. A method of crossing ISI cancellation comprising:
    minimizing inter symbol interference (LSI) at data sampling and crossing sampling points in a symbol interval of an input signal; and
    generating data samples and crossing samples at the data sampling and crossing sampling points in the symbol interval of the input signal, wherein each crossing sample is generated in response to a sample of the input signal sampled at the crossing sampling point in the symbol period of the input signal following ISI minimization, a first threshold, a second threshold, and a prior data sample.

12. The method according to claim 11, further comprising:
    generating a first intermediate signal in response to either the input signal or a second intermediate signal; and
    generating the second intermediate signal in response to either the input signal or the first intermediate signal.

13. The method according to claim 12, further comprising:
    generating a data signal in response to the first intermediate signal; and generating a crossing sample signal in response to the second intermediate signal.

14. The method according to claim 11, wherein generating said crossing samples comprises:
    generating a plurality of detector output signals, wherein each detector output signal is based upon a different threshold value; and
    selecting one of the plurality of detector output signals as said crossing sample signal based upon a plurality of previously recovered symbols.

15. The method according to claim 14, wherein the threshold values with which each of said plurality of detector output signals is generated are determined based upon a linear combination of terms from an estimated channel pulse response.

16. The method according to claim 12, wherein generating the second intermediate signal further comprises:
    generating an output signal in response to the input signal and a plurality of feedback signals;
    sampling said output signal in response to a clock signal;
    comparing a sample of said output signal to said first threshold;
    comparing said sample of said output signal to said second threshold;
    selecting between a result of the comparison with said first threshold and a result of the comparison with said second threshold in response to a prior data sample from said input signal; and
    generating said plurality of feedback signals in response to previous data samples of said input signal and a plurality of tap weights.

17. The method according to claim 12, wherein generating data samples and crossing samples at the data sampling and crossing sampling points in the symbol interval of the input signal comprises:
    sampling said second intermediate signal;
    detecting a first crossing sample value based upon said first threshold;
    detecting a second crossing sample value based upon said second threshold; and
    selecting between said first crossing sample value and said second crossing sample value in response to a prior data sample from said first intermediate signal.

18. The method according to claim 12, wherein generating the first intermediate signal comprises performing decision feedback equalization on either the input signal or the second intermediate signal.

19. The method according to claim 12, wherein said second intermediate signal is generated using a crossing ISI cancellation circuit.

20. An apparatus comprising:
    a detector circuit configured to generate data samples and crossing samples at data sampling and crossing sampling points in a symbol interval of an input signal; and
    a data inter symbol interference (ISI) cancellation circuit configured to minimize ISI at the data sampling points in the symbol interval of the input signal, wherein said data ISI cancellation circuit comprises (i) an adder configured to generate an output signal in response to a signal presented to an input of said data ISI cancellation circuit and a plurality of feedback signals, (ii) a first comparator having a first threshold, (ii) a second comparator having a second threshold, (iii) a sampler configured to sample the output signal in response to a clock signal and present samples to the first and the second comparators, (iv) at least one multiplexer configured to select between an output of the first comparator and an output of the second comparator in response to a data sample from said detector circuit, and (v) a plurality of multipliers, each configured to generate a respective one of said plurality of feedback signals in response to a respective data sample from said detector circuit and a respective tap weight.

* * * * *